United States Patent
Krutsch (10) Patent No.: US 12,125,289 B2
(45) Date of Patent: Oct. 22, 2024

(54) METHOD FOR EVALUATING A MINIMUM BRAKING DISTANCE OF A VEHICLE AND VEHICLE

(71) Applicant: ZENUITY AB, Gothenburg (SE)

(72) Inventor: Robert Krutsch, Munich (DE)

(73) Assignee: Zenuity AB, Gothenburg (SE)

(*) Notice: Subject to any disclaimer, the term of this patent is extended or adjusted under 35 U.S.C. 154(b) by 239 days.

(21) Appl. No.: 17/776,641

(22) PCT Filed: Nov. 15, 2019

(86) PCT No.: PCT/EP2019/081514
§ 371 (c)(1),
(2) Date: May 13, 2022

(87) PCT Pub. No.: WO2021/093970
PCT Pub. Date: May 20, 2021

(65) Prior Publication Data
US 2022/0402494 A1 Dec. 22, 2022

(51) Int. Cl.
*G06V 20/56* (2022.01)
*B60W 30/16* (2020.01)
(Continued)

(52) U.S. Cl.
CPC ............ *G06V 20/56* (2022.01); *B60W 30/16* (2013.01); *B60W 30/18109* (2013.01);
(Continued)

(58) Field of Classification Search
CPC .... G06V 20/56; G06V 20/588; G06V 10/454; G06V 10/82; B60W 30/16;
(Continued)

(56) References Cited

U.S. PATENT DOCUMENTS

| | | | |
|---|---|---|---|
| 10,106,153 | B1 | 10/2018 | Xiao et al. |
| 10,275,662 | B1 | 4/2019 | Askeland |
| 2018/0194286 | A1 | 7/2018 | Stein |

FOREIGN PATENT DOCUMENTS

WO 2017/053415 A1 3/2017

OTHER PUBLICATIONS

International Search Report and Written Opinion mailed Sep. 17, 2020 for International Application No. PCT/EP2019/081514, 24 pages.

(Continued)

*Primary Examiner* — Hai H Huynh
(74) *Attorney, Agent, or Firm* — Sage Patent Group (57) ABSTRACT

A method for evaluating a minimum braking distance of a vehicle, in particular a car. The method comprises the step of obtaining at least one image in a movement direction of the vehicle associated substantially with an actual location of vehicle. A first road type indication from the at least one image is determined by a trained neural network architecture. Second road type indication associated with the actual location of the car are obtained from a database and compared with the first road type indication. If the second road type indication supports the determined first road type indication, an adjustment parameter associated with one of the at least first and second road type indication is selected. If second road type indication does not support the determined first road type indication, a default adjustment parameter as adjustment parameter is selected. Finally, a minimum braking distance using the adjustment parameter is set.

19 Claims, 6 Drawing Sheets

(51) Int. Cl.
*B60W 30/18* (2012.01)
*B60W 40/06* (2012.01)
*B60W 40/105* (2012.01)
*G06V 10/44* (2022.01)
*G06V 10/82* (2022.01)

(52) U.S. Cl.
CPC .......... *B60W 40/06* (2013.01); *B60W 40/105* (2013.01); *G06V 10/454* (2022.01); *G06V 10/82* (2022.01); *G06V 20/588* (2022.01); *B60W 2420/403* (2013.01); *B60W 2420/408* (2024.01); *B60W 2530/20* (2013.01); *B60W 2552/05* (2020.02); *B60W 2554/402* (2020.02); *B60W 2554/80* (2020.02); *B60W 2555/20* (2020.02)

(58) Field of Classification Search
CPC .......... B60W 30/18109; B60W 40/105; B60W 40/06; B60W 2420/403; B60W 2420/408; B60W 2530/20; B60W 2552/05; B60W 2554/402; B60W 2554/80; G60W 2555/20; G06F 18/24143

USPC ............................................... 701/70
See application file for complete search history.

(56) References Cited

OTHER PUBLICATIONS

Vicente Milanes et al; "Vision-based active safety system for automatic stopping", Expert Systems With Applications, vol. 39, No. 12, Sep. 1, 2012, pp. 11234-11242 (9 pages).

Danfei Xu et al; "PointFusion: Deep Sensor Fusion for 3D Bounding Box Estimation", 2018 IEEE/CVF Conference on Computer Vision and Pattern Recognition, Jun. 18, 2018, pp. 244-253 (10 pages).

Hongbo Gao et al; "Object Classification Using CNN-Based Fusion of Vision and LIDAR in Autonomous Vehicle Environment", IEEE Transactions on Industrial Informatics, IEEE Service Center, New York, NY, US, vol. 14, No. 9, Sep. 1, 2018, pp. 4224-4231 (8 pages).

Yuan-Lin Chen et al; "Forward collision warning system considering both time-to-collision and safety braking distance", Int. J. Vehicle Safety, vol. 6, No. 4, 2013, pp. 347-360 (14 pages).

A. A. Sharizli et al; "New Method for Distance-based Close Following Safety Indicator", Traffic Injury Prevention, vol. 16, No. 2, Oct. 15, 2014, pp. 190-195 (7 pages).

METHOD FOR EVALUATING A MINIMUM BRAKING DISTANCE OF A VEHICLE AND VEHICLE

CROSS-REFERENCE TO RELATED APPLICATIONS

This application is a 35 U.S.C § 371 national stage application for International Application No. PCT/EP2019/081514, entitled "A METHOD FOR EVALUATING A MINIMUM BREAKING DISTANCE OF A VEHICLE AND VEHICLE", filed on Nov. 15, 2019, the disclosure and content of which is hereby incorporated by reference in its entirety

TECHNICAL FIELD

The present disclosure relates to a method for evaluating a minimum braking distance of a vehicle and a method for evaluating a minimum braking distance of a vehicle. The invention also relates to a vehicle having an arrangement for evaluating a minimum braking distance of the vehicle.

BACKGROUND

Vehicle driving assistants are becoming more and more popular. In addition, manufacturers are developing semi- or fully autonomous vehicles that are capable of adjusting the speed to the traffic flows around them. When driving in an assistant mode, the vehicle uses optical, laser or radar information to identify a vehicle moving in front and sets a braking distance between the vehicle in front and itself. In this regard, braking distance or minimal braking distance refers to the distance a vehicle will travel from the point when its brakes are fully applied to when it comes to a complete stop. The expression braking distance in this application will refer to the minimum distance between two cars that is required to avoid a crash when the leading car brakes from an initial speed to full stop.

Various parameter may influence the braking distance, including, but not limited to the speed, the road type, environmental conditions, tyre type, the condition of the brakes, the type of car and so on. In current implementation, the braking distance is often set to a higher value than actually required including a significant safety margin. Such approach may cause irritation for the driver. Hence, it is an object to improve the current model enabling the application of a more accurate minimum braking distance between driving vehicles.

SUMMARY

In the following, the expression "braking distance" will refer throughout the application to the minimum distance between two cars that is required to avoid a crash when the leading car brakes from an initial speed to full stop. The expression vehicle refers to any kind of motorized vehicle, including, but not limited to cars, trucks, SUV's, commercial vehicles and motorcycles. All these vehicles may be organized in subgroups, each of them having certain characteristics.

According to a first aspect there is provided a method for evaluating a minimum braking distance of a vehicle, in particular a car, the method comprising:

obtaining at least one image in a movement direction of the vehicle associated substantially with an actual location of the vehicle;

determining, by a trained neural network architecture, first road type indication from the at least one image, obtaining from a database second road type indication associated with the actual location of the car;

evaluating whether the second obtained road type indication supports the determined first road type indication:

(i) selecting an adjustment parameter, if the second road type indication supports the determined first road type indication, wherein the adjustment parameter is associated with one of the at least first and second road type indication; and (ii) selecting a default adjustment parameter as the adjustment parameter, if the second road type indication does not support the determined first road type indication; and setting a minimum braking distance using the adjustment parameter.

By comparing the determined road type indication with additional information associated with the position of the vehicle obtained from a database, the confidence level for correct road type indication is increased. The additional information also contain a road type indication of information related to it and can be obtained from the navigational system.

Database can be part of the vehicle or the information (i.e. the second road type indication) can be obtained via a wireless network connection.

In some aspects, evaluating whether the second obtained road type indication supports the first road type indication comprises an evaluation of a difference between the first road type indication and the second road type indication and a comparison of the evaluated difference with a threshold to determine whether the second road type indication supports the determined first road type indication.

According to some embodiments, obtaining at least one image comprises the steps of obtaining an optical image, in particular a monocular image; and obtaining information from one or more sensors. The one or more sensors can include LIDAR sensors, radar sensors, infrared sensors, acoustic sensors, rain sensors, and light sensors or combinations thereof. Hence, information of several sensors can be combined with the image information thus improving the accuracy of the subsequent determination step. Probability of correct identification of road type is increased.

According to some embodiments, determining, by a trained neural network architecture may comprise determining for a first feature map from the obtained optical image a first probability value associated with a road type, determining for a second feature map from the obtained information a second probability value associated with a road type, determining for a third feature map combined of the first and second feature map a third probability value associated with the road type and determining the road type indication out of the first, second and third probability value.

The neural network architecture may therefore use the previously obtained image and sensor information to detect separately a road type. Further, a road type detection is performed by using the combined information from the sensor and the camera. All three results are then combined to evaluate the road type indication. Such approach reduces potential errors and increases the probability for accurate identification and recognition of the road type. The neural network architecture is trained accordingly to perform the evaluation based on the feature maps for the image and the sensor information and based on the feature map for a combination of the image and sensor information.

According to some embodiments, determining a road type indication comprises—obtaining at least one fourth probability value, the at least one fourth probability value associated with a previously determined road type indication;—determining the road type indication out of the first, second and third probability value and the at least one fourth probability value. Utilizing historical information about previous—that is fourth probability value—information about a road type can further increase the confidence in correct indication of the road type.

Evaluating a full-scaled image that might be used for several other purposes as well requires large computational efforts hence, in some aspects, the steps of determining for the first or for the second feature map may provide down sampling the obtained optical image or cropping the obtained optical image or the down sampled optical image. A feature map is generated from the feature map of the cropped or down sampled optical image. A similar approach may be used for the information obtained by the one or more sensors. The obtained information may be cropped and a feature map is generated therefrom.

Some aspects refer to the architecture of the trained neural network. The trained neural network architecture may comprise a trained ResNet architecture for providing a feature map of the obtained image or an image derived therefrom and a trained PointNet architecture for providing a feature map of the obtained information or information derived therefrom. A Softmax function or derivate utilizes the feature maps and is configured to receive at least parts of the provided feature maps.

Some aspects concern the default adjustment parameter. The adjustment parameter may be associated with the at least first and second road type indication that causes a longer minimum braking distance. Alternatively, the default adjustment parameter may be selected as the adjustment parameter that causes a longer minimum braking distance compared to any of the adjustment parameters associated with the at least first and second road type indication. Further, alternatively, the default adjustment parameter may be selected as the adjustment parameter associated with a road type that causes the longest braking distance at a given speed compared to other road types.

The minimum braking distance may vary in accordance with changes of or in certain environmental conditions. Hence, the method may comprise to determine an environmental condition, in particular humidity, temperature, parameters from previously measured braking events or rain; and to adjust the minimum braking distance in response to the determined environmental condition.

Apart from the road type and environmental conditions, the braking distance is also depending on the type of vehicle in front. For example, various vehicles have different braking distances and this may be taken into account. In some aspect the comprises the steps of determining, by a trained neural network architecture, a type of a leading vehicle from the obtained at least one image; and adjusting a minimum braking distance in response to the determined type of leading vehicle.

Consequently, the type of vehicle is evaluated using object recognition and classification to adjust the minimum braking distance. This may allow reducing a safety margin otherwise necessary thereby improving the traffic flow and the driver's confidence in driving assistants. The neural network may be able to determine various types of vehicles including, but not limited thereto a sports car or supercar, a minivan, a pick-up truck, a SUV, a van, a station wagon, a truck and a motorcycle.

To improve the confidence in recognition and classification for the type of car, historical information e.g. a previous classification and recognition can be taken into account. According to some embodiments, determining, by a trained neural network architecture comprises obtaining information about a type of a previously leading vehicle, and evaluating whether the information about a type of a previously leading vehicle supports the determined type of the leading vehicle. If the information about a type of a previously leading vehicle supports the determined type of the leading vehicle, the adjustment parameter associated with type of the leading vehicle is selected. Likewise, if the information about a type of a previously leading vehicle does not support the determined type of the leading vehicle, a default adjustment parameter is selected as the adjustment parameter. The minimum braking distance is then adjusted using the adjustment parameter.

The trained neural network architecture used for recognition and classification of the vehicle type may adapted for determining a first feature map from an obtained optical image and determining a second feature map from obtained information, particular from LIDAR or RADAR information and subsequently combining the first and second feature map to classify a vehicle and identify its type.

In further aspects, the step of determining, by a trained neural network architecture may comprise detecting one or more objects in the at least one obtained image utilizing a first sub-potion of the trained neural network architecture, classifying one or more detected objects by a second sub-portion of the trained neural network architecture; and identifying the type of car in response to the classified one or more detected objects.

According to some embodiments, the trained neural network architecture comprises at least one ResNet architecture coupled a RPN and an identification network architecture, in particular a region based convolutional neural network.

Another aspect relates to an adjustment of the minimum braking distance in response to the tyre tread. The method may comprise determining a tyre tread and adjusting a minimum braking distance in response to the determined tyre tread. Consequently, the minimum braking distance can be determined with higher accuracy and subsequently risk of accidents will be reduced without adding a too large safety margin.

For the purpose a determining the tyre tread, a respective model can be used. In some embodiments, the method may measure a braking distance or braking time at a predetermined speed and calculate a nominal braking distance or nominal braking time based on at least one parameter. This parameter can be a predetermined speed, an acceleration, a road type, an environmental condition, in particular one of humidity, temperature and status of wipers, a nominal tyre tread, a position of the vehicle or a combination thereof. The tyre tread is evaluated as a function of the measured braking distance and the nominal braking distance.

It may be useful in some instances to compare an estimated tyre tread with a previously stored measurement of the tyre tread and subsequently selecting the tyre tread that causes a longer minimum braking distance. While such approach does unnecessarily in some situations increase the minimum braking distance, it also significantly reduces the risk of a potential accident.

Another aspect is related to adjust the minimum braking distance based on a leading vehicle. The method comprises the steps of:

obtaining at least one image, particular in a current movement direction of the vehicle;

determining, by a trained neural network architecture, a type of a leading vehicle from the obtained at least one image;

obtaining from a database an adjustment parameter in response to the determined type of the leading vehicle;

setting a minimum braking distance using the adjustment parameter.

By determining type of leading vehicle from a database with various vehicle types, the minimal braking distance is adjusted to a suitable level to ensure being able to come to a full stop if the leading vehicle applies full brakes. The database can be part of the vehicle or the information can be obtained via a wireless network connection from a database elsewhere. The type of vehicle to be determined may include but not limited to one of the following types: a sports car or supercar, a minivan, a pick-up truck, a SUV a van, a station wagon, a truck, a motorcycle, and a trailer.

The step of obtaining from a database an adjustment parameter may comprise obtaining information about a type of a previously leading vehicle and evaluating whether the information about a type of a previously leading vehicle supports the determined type of the leading vehicle. If the information about a type of a previously leading vehicle supports the determined type of the leading vehicle, the adjustment parameter associated with type of the leading vehicle is selected. If the information about a type of a previously leading vehicle does not support the determined type of the leading vehicle, a default adjustment parameter is selected as the adjustment parameter.

When setting a minimum braking distance other parameters may be taken into account. For example, the minimum braking distance can be adjusted in response to the distance to the vehicle in front, the speed of the vehicle in front, the speed of the own vehicle or a combination thereof.

In the presently proposed method, an image is obtained. The image may comprise an optical image. It may however also comprise obtaining information from one or more sensors wherein one or more sensors include at least one of LIDAR sensors, Radar sensors, infrared sensors, acoustic sensors; rain sensors, light sensors or a combination thereof. Hence, information from various sources can be used as based material for the recognition and classification of the vehicle.

The trained neural network architecture utilized for the classification of the vehicle type can be adapted to determine a first feature map from an obtained optical image, determine a second feature map from obtained information; and combine the first and second feature map to classify a vehicle and identify its type.

In some instances, the trained neural network can be divided into different sub-groups responsible for various task in the classification process. Hence, the method may use a first sub-potion of the trained neural network architecture to detect one or more objects in the at least one obtained image and classify one or more detected objects in a second sub-portion of the trained neural network architecture. Then the type of car is identified in response to the classified one or more detected objects.

According to some embodiments, the trained neural network architecture comprises at least one ResNet architecture coupled a RPN and an Identification network architecture, in particular a region based convolutional neural network.

Apart from the classification of the leading vehicle, further parameter, like road type can be taken into account. In an embodiment a method further comprises determining, by a trained neural network architecture, first road type indication from the at least one image, obtaining from a database second road type indication associated with the actual location of the car and evaluating whether the second obtained road type indication supports the determined first road type indication.

If the second road type indication supports the determined first road type indication, an adjustment parameter associated with one of the at least first and second road type indication is selected. On the other hand, if the second road type indication does not support the determined first road type indication, a default adjustment parameter as the adjustment parameter is selected. The minimum braking distance is evaluated using the adjustment parameter.

The additional setup using not only the vehicle type but also the road type, will increase the accuracy of the minimum braking distance and therefore increase the confidence level in such driving assistants.

In some aspects, evaluating whether the second obtained road type indication supports may comprise a step of evaluating a difference between the first road type indication and the second road type indication and subsequently comparing the evaluated difference with a threshold to determine whether the second road type indication supports the determined first road type indication. Such steps may increase the confidence level during the process.

In some aspect, the trained neural network architecture may be adapted to determine for a first feature map from the obtained optical image a first probability value associated with a road type and for a second feature map from the obtained information a second probability value associated with a road type. The trained neural network architecture may also determine for a third feature map combined of the first and second feature map a third probability value associated with the road type and subsequently determine a road type indication out of the first, second and third probability value.

Such kind of multiple identification of road type or more precisely, generating multiple probability values for a specific road type will improve the accuracy of a correct identification of the road type. Hence, errors during the identification of road types are reduced.

According to some embodiments, the steps of determining for the first or for the second feature map comprise at least one of: down sampling the obtained optical image; cropping the obtained optical image or the down sampled optical image; cropping the obtained information; generating a feature map from cropped or down sampled optical image; generating a feature map from the cropped information. These aspects reduce the computational efforts in preparing the images and subsequently deriving the feature maps. Furthermore, preparing the images enables to restrict the image to areas of interest and thus reduce potential errors in subsequent processing steps.

Similar to other aspects, an evaluation of the road type indication may utilize historical or previous information. Consequently, the method may comprise obtaining at least one fourth probability value, the at least one fourth probability value associated with a previously determined road type indication, determining the road type indication out of the first, second and third probability value and the at least one fourth probability value.

As previously outlined, the default adjustment parameter can be adapted to be associated with the at least first and second road type indication that causes a longer minimum braking distance. Alternatively, the default adjustment parameter is a value that causes a longer minimum braking distance compared to any of the adjustment parameters associated with the at least first and second road type indication. Also alternatively, the default adjustment parameter may be associated with a road type that causes the longest braking distance at a given speed compared to other road types.

The above methods and aspects can be implemented and realize in a vehicle, particular a car. A vehicle may comprise a memory to store various sensor information and one or more processors to process these and other information. The vehicle is configured to perform the previously described method either separately or in any combination method thereof. Various aspects of the method can be performed within the vehicle, other aspects may be performed in a data cloud and the result transmitted via a wireless communication to the vehicle and the processors therein.

The sensor in the vehicle may comprise a camera to obtain a plurality of images. Further sensor may be included, for example a LIDAR system to obtain LIDAR information, a plurality of ultrasonic sensors, a radar system, one or more infrared sensors, one or more rain sensors and one or more light sensors. Several of these sensors can be combined.

Another aspect concerns a vehicle having an arrangement for evaluating a minimum braking distance of the vehicle. The arrangement may comprise one or more cameras to obtain at least one image in the direction of movement of the vehicle and at least one other sensor to obtain sensor information indicative of the road type. The vehicle comprises a first trained neural network architecture configured to determine first road type indication from the at least one image and the sensor information and an evaluation unit coupled to the neural network architecture and to a database and configured to compare first road type indication with second road type indication from the database and to derive an adjustment parameter therefrom. The results are provided to a setting unit coupled to the evaluation unit and configured to set the minimum braking distance using the adjustment parameter.

More particularly, in some embodiments, the evaluation unit is configured to select an adjustment parameter, if the second road type indication supports the determined first road type indication, wherein the adjustment parameter is associated with one of the at least first and second road type indication; and select a default adjustment parameter as the adjustment parameter, if the second road type indication does not support the determined first road type indication.

According to some embodiments, the vehicle may further comprise a second trained neural network architecture configured to determine a type of a leading vehicle from the obtained at least one image; and wherein the evaluation unit or the setting unit is configured to adjust a minimum braking distance based on at least the determined type of leading vehicle. This aspect enables to reduce the safety margin by taking knowledge of the leading vehicle into account without compromising the safety when driving.

In some further aspects the vehicle may comprise a tyre tread estimator coupled to the first neural network to receive a road indication; wherein the tyre tread estimator is configured to estimate a tyre tread based at least on the speed of the vehicle, the road indication and an environmental condition, in particular temperature, humidity and rain; and wherein the evaluation unit or the setting unit is configured to adjust a minimum braking distance in response to the estimated tyre tread.

As stated above the vehicle does contain one or more trained neural networks. In some embodiments the first and/or the second trained neural network architecture comprises a trained ResNet architecture for providing a feature map of the obtained image or an image derived therefrom, a trained PointNet architecture for providing a feature map of the obtained information or information derived therefrom and a Softmax function or derivate therefrom, configured to receive at least parts of the provided feature maps. The above parts of the neural networks are suitable for the objective to detect object in one or more images and classify them accordingly.

The first trained neural network architecture is configured to determine for a first feature map from the obtained optical image a first probability value associated with a road type and to determine for a second feature map from the obtained information a second probability value associated with a road type. To further improve accuracy, the first trained neural network architecture is configured to determine for a third feature map combined of the first and second feature map a third probability value associated with the road type. The road type indication may be determined by the trained neural network architecture out of the first, second and third probability value.

On the other hand the second trained neural network architecture may be configured to determine a first feature map from an obtained optical image, to determine a second feature map from obtained information and combine the first and second feature map to classify a vehicle and identify its type.

Both trained neural network architectures may be configured to down sample the obtained optical image and crop the obtained optical image or the down sampled optical image. Similar obtained information may be cropped. A feature map may be generated by the first and second neural networks from cropped or down sampled optical image. Likewise, a feature map can be generated from the cropped information.

In some aspects, historical information or result are taken into account. The evaluation unit of the vehicle may be configured to obtain at least one fourth probability value, the at least one fourth probability value associated with a previously determined road type indication. The evaluation unit is then configured to determine the road type indication out of the first, second and third probability value and the at least one fourth probability value.

Similarly, the evaluation unit of the vehicle may be configured information of the type of a previously leading vehicle and compare such information with current information about the leading vehicle. The evaluation unit may then adjust the minimum distance parameter based on results of such comparison similar to the various ways described above.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to convey fully the scope of the disclosure to the skilled person.

Figure 1:
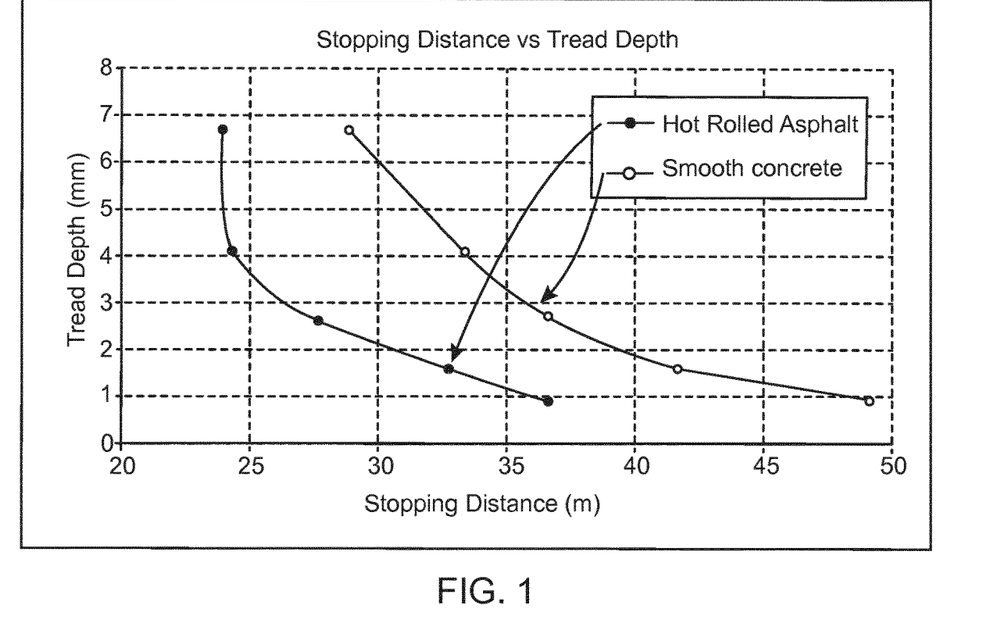
FIG. 1 shows a diagram illustrating the stopping distance in dependence of the road type.

FIG. 1 shows a diagram illustrating the stopping distance based on various road types at a specific tyre tread depth. There are multiple ways how the safe distance is estimated in the literature; the simplest way is to model the vehicle and the surrounding cars as point masses. As can be observed from FIG. 1 the variation of this distance is heavily dependent on the road type and can vary up to 12 meters. In addition, the tyre tread depth has a significant influence on the minimum braking distance as well. Hence, various aspect can be taken into account to adjust the minimum safety distance to a leading car.

Figure 2:
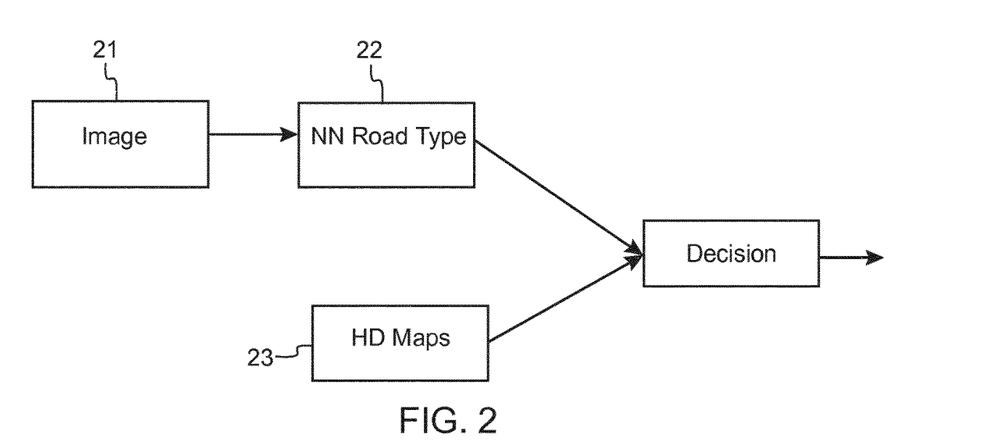
FIG. 2 illustrates a general principle of setting a minimum braking distance based on the road type in accordance with the proposed principle.

FIG. 2 illustrates some aspects of the basic principle of adjusting the minimum braking distance of a vehicle. For this purpose, a trained neural network is used to detect characteristics of the road type and classify the road type based on one or more obtained images as well as option additional information. For example, the obtained image 21 may show a portion of the street. The neural network detects this portion and determines the road type, e.g. if the street contains asphalt or concrete. This preliminary indication is compared with information about the street type obtained from Map data 23, e.g. coming from a navigation system. The comparison is will further improve the confidence level in the detection. At the same time, the comparison between the two different set of information, one static and originating from a database, one dynamically obtained can take variances or recent road type changes into account (i.e. repair of the street and the like). The dynamic information can also be used to keep the information from the map updated.

Figure 3:
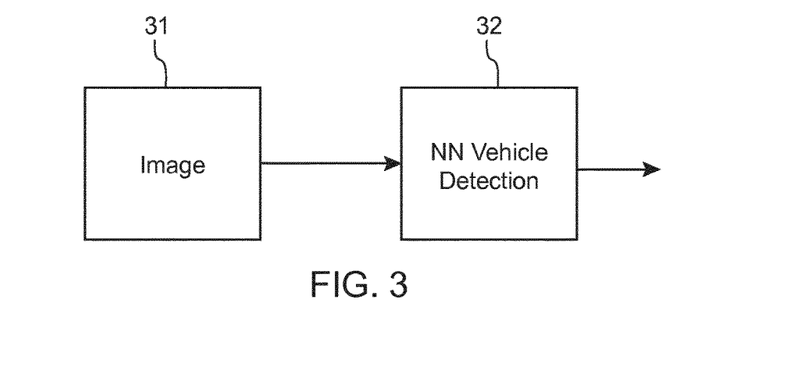
FIG. 3 shows the principle of adjusting or setting the minimum braking distance based on the type of leading vehicle in accordance with the proposed principle.

FIG. 3 illustrates an alternative or an additional aspect of setting or adjusting the braking distance. In this approach, the leading vehicle is detected and classified by a trained neural network 32 based on an obtained image 31. Depending on the classification, the minimum braking distance is adjusted. For example, a truck will have, at a given speed a different, mostly larger braking distance than a sports car. Hence, the minimum braking distance should be set to a larger value if a sports car is detected as the leading vehicle, due to its improved braking system.

Figure 4:
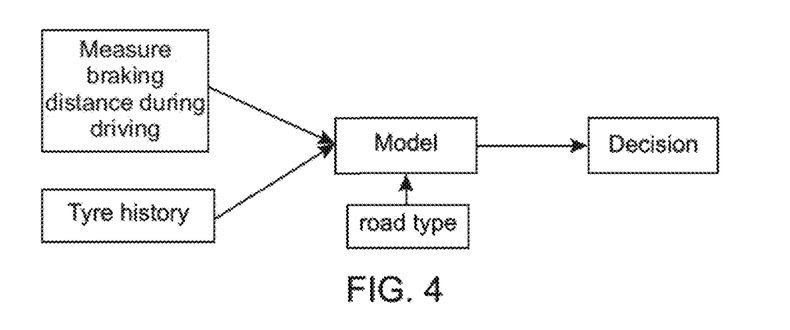
FIG. 4 illustrates the principle of adjusting or setting the minimum braking distance based on the depth to tyre treads in accordance with the proposed principle.

Finally, the minimum braking distance is also depending on the tread depth of the tyre also taking into account the road type indication. Environmental condition can also be taken into account. FIG. 4 shows the general principle of such approach. To calculate the factor used for the braking distance measurements of braking time and distance can be used. In some instances, the tyre history is taken into account. Similarly, the calculation may be based on the detected road type to achieve a more accurate result.

Based on the various classifications and identifications, the minimum safe distance is adjusted to the desired safe distance as presented in $$d = d_{min} * k$$

The distance $d_{min}$ corresponds to the maximal value of the minimum distance to ensure the vehicle will come to a stop under all reasonable circumstances. The factor k is an adjustment parameter that can vary based on the various parameters taken into account. Some of the parameters will reduce the factor k, some of them will increase the factor again. As stated above these parameters can include the road type, the leading vehicle, environmental information, tyre type, tyre depth and the like.

Figure 5:
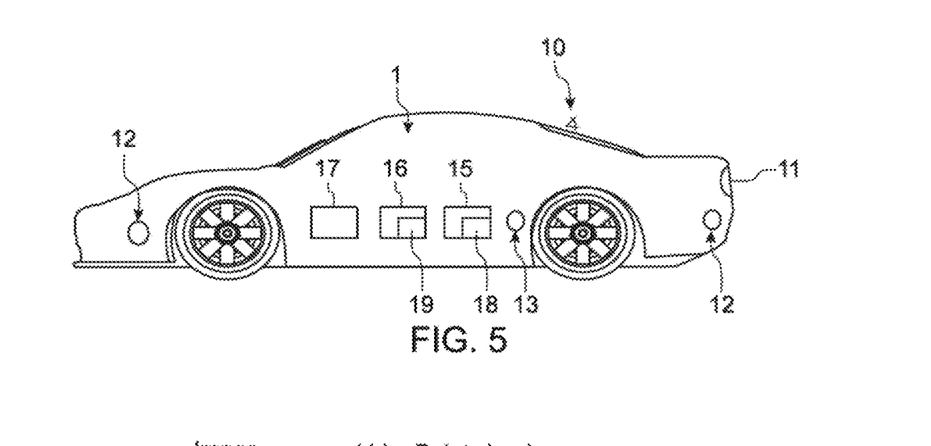
FIG. 5 shows a vehicle according to an embodiment of the present disclosure.

FIG. 5 shows a vehicle encompassing some aspect of the present disclosure, vehicle 1 is a car 1 suitable for transporting two or more persons. Car 1 comprises a camera 10 arranged on the upper part of the front shield of car 1. Camera 10 is adapted to obtain images of the area in front of the car including the road ahead. While car 1 only comprises a single camera, 10 for the purpose of this example, it may be appreciated that car 1 can include more than a single camera. For example, several cameras can be included "looking" into different directions or having different viewing angles, i.e. a wide and a narrow angle.

Car 1 further includes several other sensors obtaining information of the surroundings. These sensors include a LIDAR system 11, ultrasonic sensors 12 arranged around the car and rain or humidity sensors 13. The information from the different sensors as well as the obtained images from the camera 10 are provided to a storage and processing module, 15 and 16, respectively. Processing module 16 contains one or more processors, communication busses with the sensors and various ICU's. Storage 15 can comprise a volatile and a non-volatile memory as well as databases and the like. In some instances, a communication module 17 can be provided, that can send and receive information provided by processing module 16 to an external receiver (not shown).

The various modules 15, 16 and 17 implement a trained neural network architecture, an evaluation and a setting unit for the purpose described herein. The units are to some extent implemented in software, some feature hardware components. For example, module 15 and 16 realize a first trained neural network architecture configured to determine first road type indication from the at least one image and the sensor information. Module 16 also comprises an evaluation unit 19 coupled to the neural network architecture and to a database 18 and configured to compare first road type indication with second road type indication from the database and to derive an adjustment parameter therefrom. The database is stored in storage 18 and can include for example a navigation system or maps thereof.

In an alternative, the database with information about the road type can be stored externally and then loaded via communication module 17 based on position data into storage 15. Such step can be performed with street or map data and can further include other information like traffic information and the like. Finally, processing module 16 provides a setting unit coupled to the evaluation unit and configured to set the minimum braking distance using the adjustment parameter.

Figure 6:
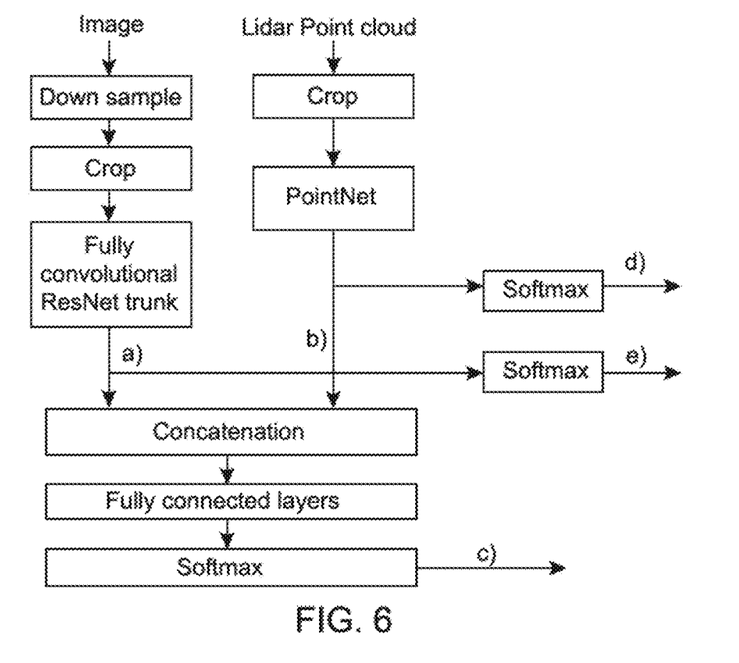
FIG. 6 illustrates a more detailed view of aspect including a trained neural network to determine the road type from various sensor data.

FIG. 6 illustrates a more detailed view of aspect including a trained neural network to determine the road type from various sensor data. The trained neural network utilizes two different kinds of input information. On the one side, an image is provided to the trained neural network for further processing. The image is obtained from a camera and down sampled on the input side. Down sampling will reduce the computational efforts without significantly compromising the detection and classification accuracy. In addition, the image might be cropped. Cropping in this regard corresponds to cutting out a predefined portion of the down sampled image. Thus, it is used for example to cut out an upper portion of the image and only provide the lower portion, most likely containing parts of the street. Cropping or down sampling can also be omitted or the order changed.

The pre-processed image is then applied to a ResNet module of the trained neural network. ResNet utilizes several tasks to identify a feature map (a) thus detecting object of interest including but not limited to a portion of the street. The ResNet is a typical part of a neural network often applied for object detection and classification in an image. The feature map (a) provided is applied to a Softmax function to determine a probability value (d) for the detected object with respect to define road types. In other words, the trained neural network provides a probability value (d) on a detected object in an image to evaluate the likelihood of the object being a specific road type. The higher the probability value the more likely the indicated road type is correct. By cropping the image or down sampling it, object detection of road structure is improved.

In addition to the processing of the image, the trained neural network processes secondary information, for example a data point cloud obtained by a LIDAR system. Laser rays transmitted from the LIDAR are reflected back in a characteristic manner, which may help to identify the road type. Similar to the preprocessing steps of the image, the LIDAR point cloud is cropped to obtain an area most likely more relevant for classifying the road type. The trained neural network further comprises a PointNet architecture to process the cropped point cloud and generate a feature map (b) thereof. The feature map (b) obtained by the PointNet is also applied to a Softmax function to retrieve a probability value (e) for a road type indication.

These two input pipelines, that is the image and the LIDAR point cloud are processed independently. However, the trained neural network architecture also comprises a small number of fully connected layers to process a combination of both feature maps (a) and (b). For this purpose, the individual features of both feature maps are concatenated and applied to the connected layers together. The number of layers depend on the linearity the features already exhibit. The result is applied to a Softmax function generating a probability value (c) associated with the road type.

Figure 7:
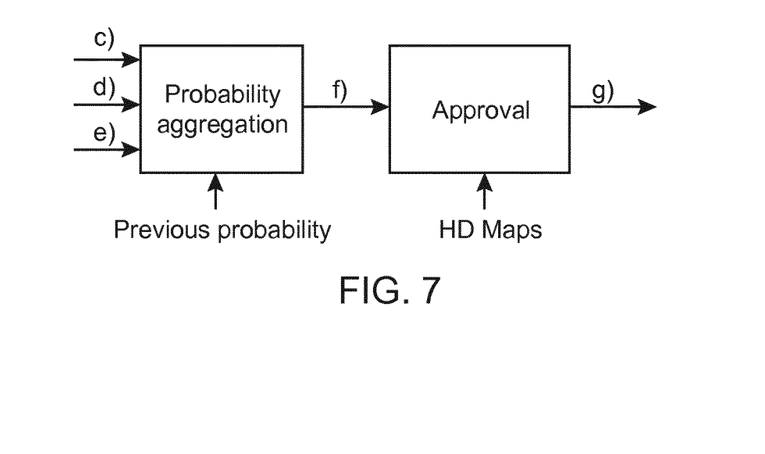
FIG. 7 shows a diagram illustrating the processing of the probability values obtained by the trained neural network in accordance with some aspects of the proposed principle.

The probability values are then combined as illustrated in FIG. 7. The various probability values are combined to obtain a road type indication. The combined values indicate the likelihood that the vehicle is driving on a specific road type. The larger the combined probability values, the more likely the specific road type may be. The combination or probability aggregation can be performed by an adaptive boosting method or the like. In adaptive boosting, the likelihood is given as a linear combination of the individual probability with the linear weighting:

$$P_{f),current}=w_1 P_{c)}+w_2 P_{d)}+w_3 P_{e)}+w_4 P_{f),previous}$$

Apart from the actual probability values, the approach uses the previous probability. To increase the confidence under the assumption that road type does not change gradually but suddenly and also not very often. The coefficient w can either be trained before using the same adaptive boosting methodology or a given training dataset. Finally, the result (f) is used in an approval step.

In this step, the assumption is that the vehicle is localized and that additional map information HD Maps are available. It is also assumed that the information HD Maps includes the indication about the road type. If the confidence of detection as it is produced by probability aggregation (f)) is higher than a threshold and the information HD Maps supports the indication the road type is indicated in (g). If there is no support of the detection from the HD map a conservative road type is selected, for example a road type with the longest braking distance.

Figure 8:
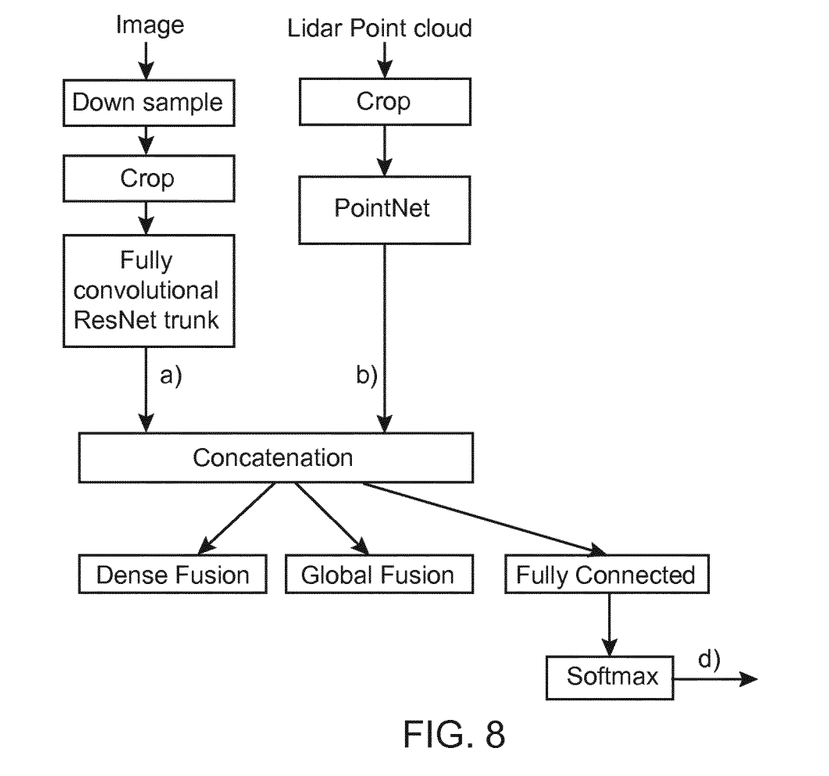
FIG. 8 shows a more detailed view of aspect including a trained neural network to determine the vehicle type of a leading vehicle.

FIG. 8 shows an embodiment of a trained neural network used for detecting and classifying a leading car. The neural network can be used to either select the minimum braking distance or adjust the minimum braking distance if needed. The trained neural network in this example has two input pipelines and processes the input in different ways. However, it is appreciated that only one input pipeline may be used is such pipeline provide a sufficiently high classification accuracy.

The first input into the trained neural network is an image, which is preprocessed as in the previously descried neural network. However, for this purpose down sampling may be utilized with a different ratio. Likewise, different areas may be cropped, for example the one in front of the vehicle, thus avoiding a passing car to be detected. A fully convolutional ResNet architecture is used to provide feature map (a) providing the features for the leading vehicle. Several other information, including a LIDOAR point cloud in this example, but also ultrasonic or other information is used to generate a second feature map (b). The second feature map (b) is derived by first cropping the LIDAR point cloud and applying the cropped cloud to a PointNet architecture.

In a next step the feature maps (a) and (b) are concatenated to provide a combined feature map. The combined feature map is used to track the vehicle using various Dense and Global fusion functions. However, tracking is not of large significance except that direction changes of the previous vehicle may be taken into account when adjusting the minimum braking distance. In addition, the combined feature map is applied to several fully connected layers and another Softmax function to classify each detected object in the feature map. The classification provides a probability value of the type of a leading vehicle. The classification may be more precise than current solution, which differentiate only between motorcycle, truck and car. The proposed neural network is trained to classify a variety of different vehicles including the different kinds of cars, like sports car, station wagon, limousine, SUV and the like. Trailers as well as different trucks might be classified as well. The probability (d) of the classification is aggregated with historical information as well as optional tracking information. More particular, the probability values of classified types of the leading car are compared with the respective probability values of the classified types of a previous process, i.e. a certain time before. A strong correlation between the probability values of different processes indicate a correct classification and returns the classification of the leading vehicle with a high confidence level. The probability value of the leading car is given as $$P_{f),current} = w_1 P_{(d)} + w_2 P_{previous}$$

whereas $P_{(d)}$ is the current probability value, $P_{previous}$ and $P_{f),current}$ corresponds to the overall probability that is used to select or adjust the coefficient k for the calculation of the minimum braking distance. The coefficient $w_1$ and $w_2$ are determined during training of the neural network with an existing data set.

Figure 9:
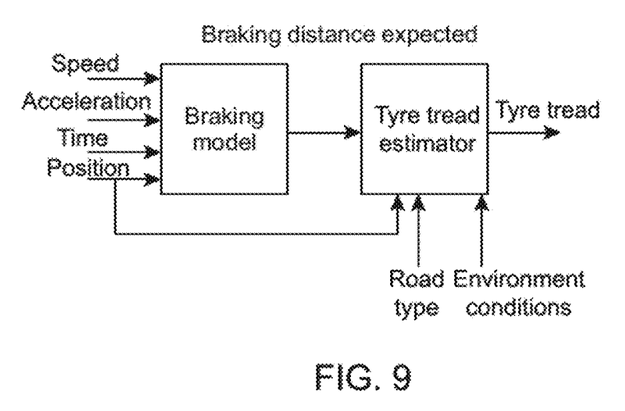
FIG. 9 shows a model illustrating various aspects for estimating the tread depth in a vehicle.

FIG. 9 shows an illustration of a braking model that can be used to estimate the tyre treads. The influence of the tyre tread on the braking distance is significant. Apart from environmental conditions and road type, it also depends on the tyres used in combination with the vehicle. Therefore, the tyre tread has to be determined for each vehicle by respective measurements and estimated using various models. In case of measurements, known speed, time, acceleration and position used to derive a first estimate of a given braking distance. In such measurements environmental conditions, tyre tread and road type is implicitly disclosed.

Apart from the measurement, a braking model established to provide the tyre tread as illustrated in FIG. 9. Similar to a direct measurement, the above-mentioned parameters of the ego vehicle are provided by the odometry module by combining multiple sensors such as IMU, camera, LIDAR, vehicle measurements. The vehicle measurements also contain information about environmental conditions, like temperature, light, humidity or rain occurrence. The time measurements is provided by internal counters, as only relative but not absolute time is needed.

The braking module used to estimate the braking distance that is expected given ideal tyre tread is based on simple Newtonian mechanics. Integrating the position one can observe if the braking maneuver was performed in a straight line or if it was performed in a curve. While it is possible to do the computation in a curve, it would make the mathematical computation more complex unnecessary; and since tyre tread degrades slowly selecting just the straight line is enough. The modelled braking distance is then compared in the tyre tread estimator block with the actual braking distance. The tyre estimator block utilizes environmental conditions and the road type for example indicated from the previously described neural network. During a calibration step a relationship between the estimated braking distance ($d_1$), measured braking distance ($d_2$) and tyre tread (T) is performed. The resulting function $$T = f(d_1, d_2)$$

is individual for each car model and a supported tyre type and can be modelled as a piecewise linear function. Function f also includes road type and environmental condition.

Figure 10:
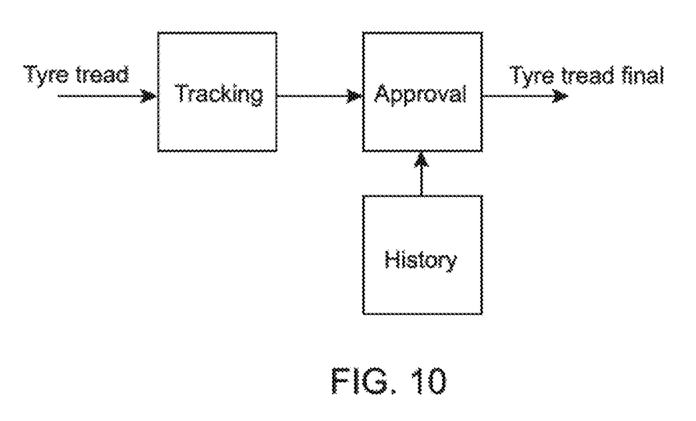
FIG. 10 illustrates a simple model for tyre tread tracking and approval function in accordance with some aspects of the present disclosure.

While the calibration can be performed and stored at factory level, the tyres tread changes over lifetime and is expected to decrease. Hence, it can be suitable to include also historical information to estimate the degradation of the tyre tread, as the calibration and the braking model assumes an ideal tyre tread. FIG. 10 shows a simple model for considering such information. A tyre degradation history is used to validate the current measurement. Given a specific tyre, car model history and mileage driven a specific degradation is expected. This expectation is stored in the History block and can be updated during the yearly inspection.

A low pass filter can be applied to the Tyre tread function; whereas historical tyre tread information $T_{old}$ have a slightly higher importance than individual measurements. The final tyre tread is then given by $$T_{new} = a * T_{old} + (1-a) T \text{ whereas} (a \gg (1-a))$$

The approval step selects the worse indication from history or the tyre tread as outputted by the tracking step and outputs the final tyre tread. This is then used to index a lookup table and adjust the coefficient k for determining the minimum braking distance.

While such approach is more conservative, it generally includes a small safety margin thereby reducing the risk of adjusting or selecting a braking distance too close to a leading vehicle.

Figure 11:
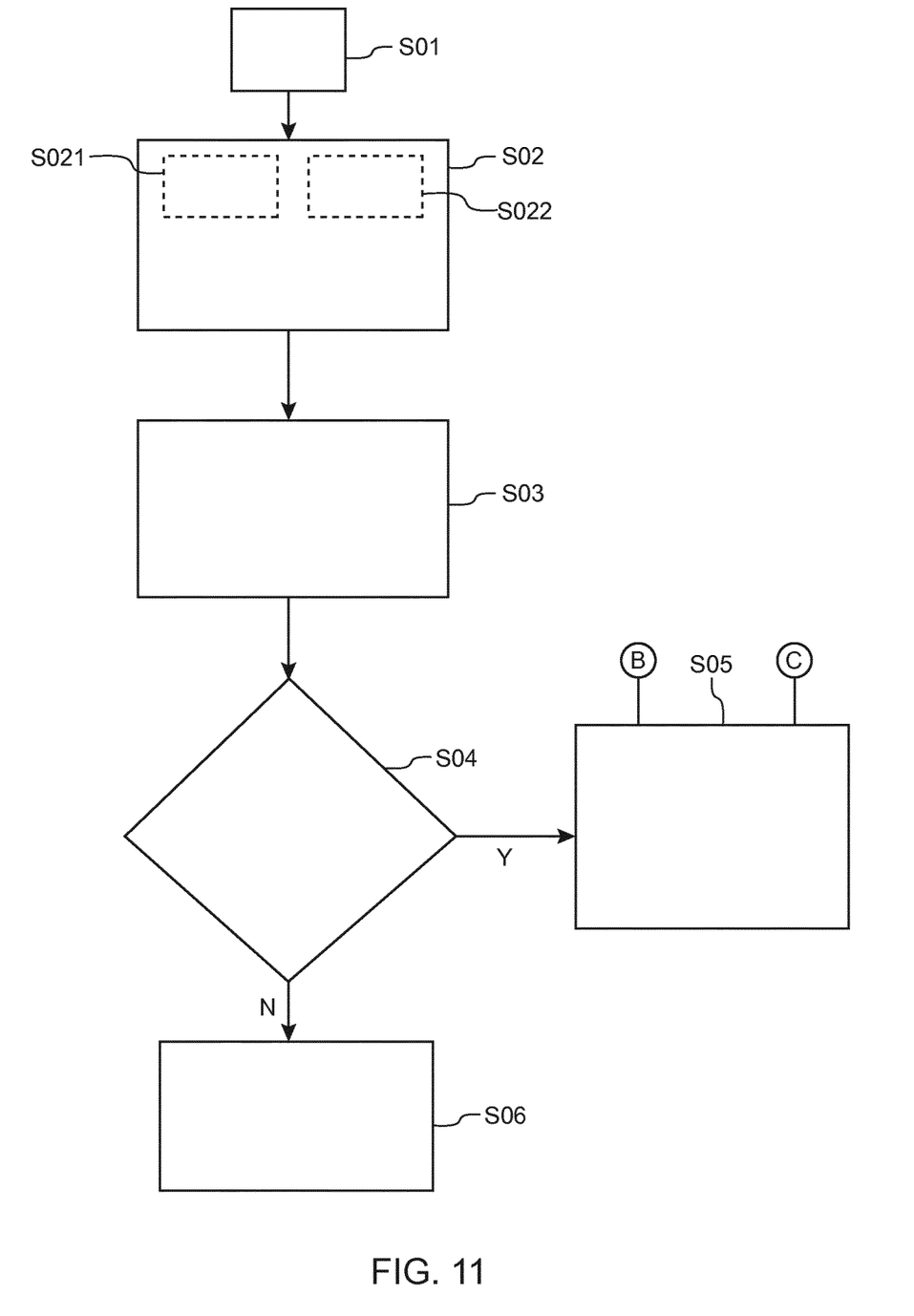
FIG. 11 shows an exemplary embodiment of a method according to some aspects of the present disclosure.

FIG. 11 shows an exemplary embodiment of a method in accordance with some principles of the present disclosure. The method evaluates a minimum braking distance of a vehicle having a leading vehicle in front. The method utilizes a trained neural network. Training a neural network is achieved by providing a data set as an input, the data set such that the results are known. Training a neural network is performed by minimizing the error, the error being the difference between the network's output and the correct results. The present method detects a road type and/or a type of the leading vehicle. In both instances, image object detection and classification networks are applied, their respective architecture known in the art.

However, in addition to a pure object detection and classification for images is not yet good enough to ensure correct classification with the required high confidence. Therefore, the present disclosure proposes a combination of object detection and classification with additional information, said information provided by the vehicle's sensors.

In a first step S01, one or more images in a movement direction are obtained. The images are associated with an actual location of the vehicle. In other words, at least the rough position or location at which the images are taken is known. The position may be used in later steps to link the information derived from the image to information associated with the location.

In Step S02, a first road type indication is determined by a trained neural network. The trained neural network utilizes the one or more input images to determine the road type as well as additional information. The images can comprise black/white or colored images, stereoscopic or monocular images. The images can also be used for different purposes like tracking leading vehicles and the like. The additional information is at least depending on the road type that is it varies with different road types, such that a classification of the road type is possible. For example, LIDAR or radar reflection may change depending on whether the road type is asphalt, concrete or cobblestones. Further, running noise of the tyres may change indicating different road types or at least a change thereof. In summary, the additional information comprise data from other sensors of the vehicle like LIDAR, radar, acoustic sensors. The trained neural network facilitates an object detection and classification architecture that is suited and trained for processing the image and additional information in a separate and combined manner to obtain an indication of the road type.

For this purpose, a pre-processing of the image is employed step S021, the pre-processing including cropping and/or down sampling. Similar, additional information is pre-processed in the same manner. After pre-processing, a respective feature map is generated from the pre-processed image and a feature map is generated from the additional information. Both feature maps are used to provide individual probability values for a certain road type. In this regard, the feature maps are applied to a Softmax function. Alternative architectures can be used to derive the road type indication from the image and the additional information.

Further, both feature maps are concatenated and the combined feature map is applied to fully connected layer to derive a probability value indicating the road types. The so derived three probability values are then aggregated to provide the final decision for a first road type indication by the trained neural network. It has been found that approach of processing feature maps of the image and the additionally separately and in a concatenated will improve correct classification.

In a further aspect option step S022 is performed. After evaluation of the first road type indication, the result is compared to a previous road type indication, for example, a road type indication obtained from the preceding measurement and iteration. It is assumed that road type does not change often and if so rather quickly, so an additional comparison with previous results will increase the confidence of a correct classification of the road type.

In step S03, a second road type indication is obtained from a database associated with the actual location of the vehicle. The database can be implemented in the vehicle itself, but can also be included in an external storage, for example in a data cloud. In one example, the navigational data available in the vehicle contains map data but also associated data like road type indication, speed limits and the like. The navigational data can be stored on the vehicle on a DVD or a similar media, but also downloaded via a wireless connection. A communication module within the vehicle will send position data to a data processing system, which returns with map data and road type indication associated with the position of the vehicle. The latter may be beneficial, as it allows more recent data to be processed within the vehicle.

In step S04, the second road type information obtained from the database is compared with the road type indication obtained by the trained neural network. If both road type indications correlate, it is assumed that the second road type indication supports the determined first road type indication and the process continues with step S05. On the other hand, if first and second road type indication do not correlate, for example are completely different, then it is assumed that the second road type indication does not support the determined first road type indication and the process continues with step S06. The comparison can include for instance comparing the difference of a probability value corresponding to the first road type indication with a value of the second road type. If the difference is below a predetermined threshold, support is assumed.

In step S05, an adjustment parameter is selected from a database. The adjustment parameter is associated with the road type indication. For example, each road type can include a specific set of parameters used to adjust the braking distance. Similar to the previous situation, the database can be stored in the vehicle, or the parameter set can be received via a communication from an external stored database. In some instances, it is suitable to transmit the set of adjustment parameter together with the second road type indication. Then the adjustment parameter will be directly used, if the comparison step S04 concludes that the second road type indication supports the first road type.

Under the assumption that the second road type indication does not support the determined first road type indication, a default adjustment parameter is selected. For example, the default adjustment parameter is selected to be the associated with the at least first and second road type indication that causes a longer minimum braking distance. Alternatively, the default adjustment parameter is a parameter causes a longer minimum braking distance than any of the adjustment parameters associated with the at least first and second road type indication. Finally, the default adjustment parameter can be associated with a road type that causes the longest braking distance at a given speed compared to other road types. In any of the above case, the default adjustment parameter is selected such as to introduce a safety margin such that there is sufficient distance between the ego vehicle and a leading vehicle to ensure that the ego vehicle comes to a complete stop.

Figure 12:
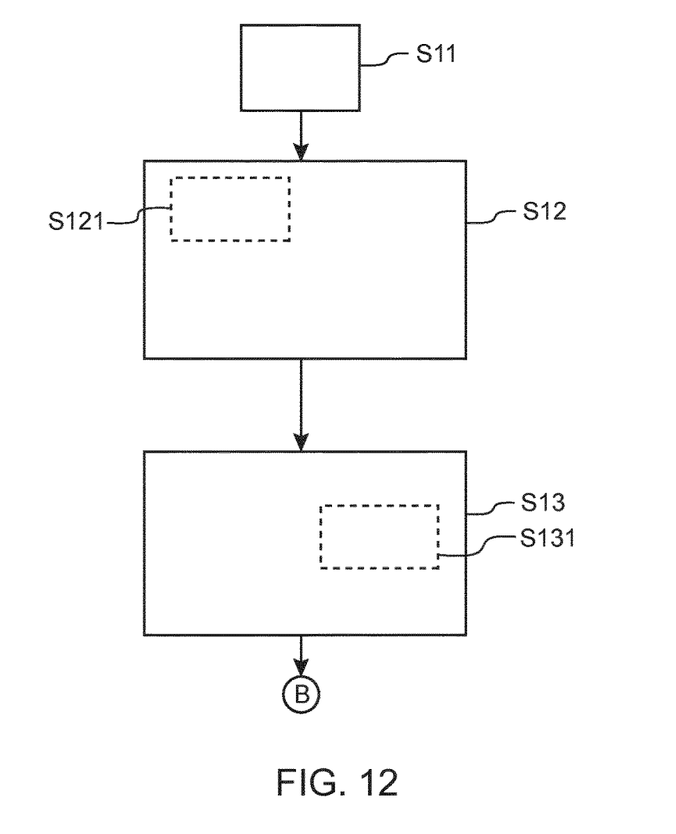
FIG. 12 shows an exemplary embodiment of a method according to some aspects of the present disclosure.

FIG. 12 illustrates an example of a method for evaluating a minimum braking distance of a vehicle based on detection and classifying of a leading vehicle. The method is used to either select or adjust the minimum braking distance. It can be used separately from the method of FIG. 11, or supplement the previously described method. Similar to the previous method one or more images and additional information are obtained in step S11. The images as well as the additional information are facing the movement direction of the vehicle. LIDAR and monocular images are generally suited to detect a leading vehicle, but other sensors can be also used. In step S12, the input is applied to a trained neural network for detecting and classifying the leading vehicle. The input information can be pre-processed in optional step S121 similar to the previous embodiment; the image and additional information are cropped and down-sampled. The down-sampled image and information are applied to a neural network architecture to obtain feature maps. The feature maps of the image and the additional information derived independently for each other are also concatenated to obtain a combined feature map.

The feature maps are applied to an architecture for object detection and classification. The results are probability values for certain vehicle types. The results are aggregated together with historical information about the leading vehicle in step S131 to determine the type of the leading vehicle. The aggregation taking into account previous vehicle classification increases the confidence that the classification of the vehicle is correct. Tracking the leading vehicle will further reduce the risk of a false classification. Such functionality is already implemented and can be utilized to some extent. The classification of the leading vehicle is more precise than actual implementations, which can classify truck, car and motorcycle, but do not distinguish between different cars. Typical car classes, that should be distinguish include a sports car or supercar, minivan, pick-up truck, SUV, van, station wagon, truck, trailer and motorcycle.

The different vehicle types are associated with an adjustment parameter indicative of its braking capabilities. The association is based on the fact, that certain cars have significant braking capabilities. For example, a sports car has a much shorter braking distance at a given speed than a minivan or a station wagon. Depending on the classified vehicle types, the associated adjustment parameter is selected. The selected adjustment parameter may be additionally adapted by weather conditions or other information. In the last step, it is used to adjust the minimum braking distance. Either the adjustment is done independently of any other information or the parameter is combined with various other adjustment parameters like the road type.

Figure 13:
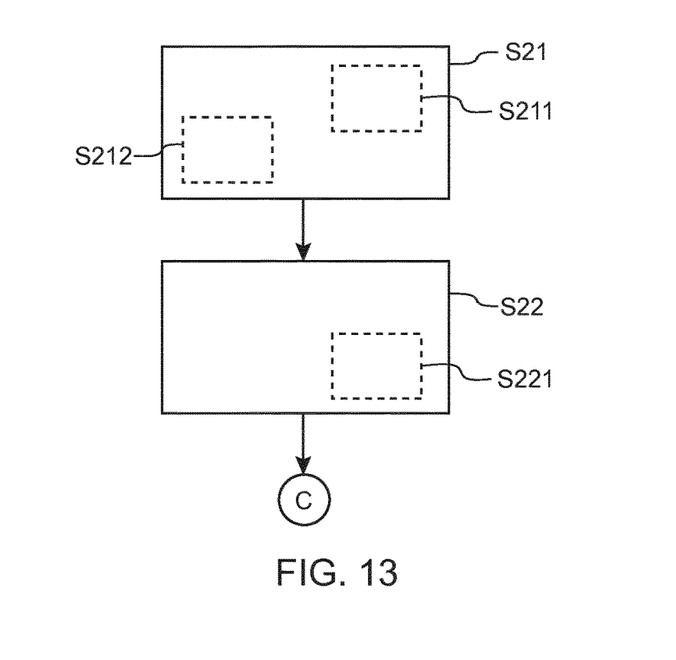
FIG. 13 shows an exemplary embodiment of a method according to some aspects of the present disclosure.

FIG. 13 illustrates an example of a method to obtain information about the tyre tread and in response thereto adjust the parameter for the minimum braking distance. The method includes step S21 that estimates a tyre tread based on measurement and a braking model. In step S22, the estimated tyre tread is compared with historical information. The result will be used to derive the adjustment parameter from a look-up table or a database. As the tyre tread strongly depends on the combination of the tyre and the vehicle type as well as wear out, mileage and so on, the database is most likely stored within the vehicle. Measuring the actual tyre tread depth on regular intervals, i.e. during annual inspection can support a more accurate historical information and improve the overall results.

During step S21, the braking distance or braking time at a predetermined speed is measured in step S211 to receive a first estimation of the braking distance. A model is used to calculate also the nominal braking distance or nominal braking time. The calculation is based on the acceleration and speed, but may also consider a tyre tread depth. The latter either is a theoretical value or is obtained from a previous actual measurement that is stored in the vehicle. Road type and environmental conditions can further be taken into account.

Both results are applied to a tyre tread estimator, which estimates in step S22 the tyre tread as a function of the measured braking distance and the nominal braking distance. Optionally in step S221, estimated tyre tread is compared with historical information of the tyre tread. The information is obtained from a database and comprises previous measurement results. Alternatively, the tyre tread depth is measured at annual inspection or generally regular intervals and stored in a database. During step S221, the estimated tyre tread is compared with the historical information. The final tyre tread may then be the tyre tread that is more conservative, that is the tyre tread, which will cause a larger minimum braking distance.

Each tyre tread is associated with a respective adjustment parameter for the minimal braking distance. They may be stored in a database in the vehicle. The adjustment parameter is used to adjust the minimal braking distance together with one of the parameters of the previous methods. As an alternative, the various adjustment parameters obtained from the different methods are compared to each other and the one with causes the longest braking distance is used to adjust the minimum braking distance. Further, the parameter obtained from road type indication or the parameter obtained from the vehicle detection is used to amend the respective other adjustment parameter. As a result, an additional safety margin is introduced.

The person skilled in the art realizes that the present disclosure is not limited to the preferred embodiments described above. The person skilled in the art further realizes that modifications and variations are possible within the scope of the appended claims.

Particularly, the different methods for adjusting the minimal braking parameters can be used individually but also combined to provide a more accurate result. Additionally, variations to the disclosed embodiments can be understood and effected by the skilled person in practicing the claimed disclosure, from a study of the drawings, the disclosure, and the appended claims.

The invention claimed is:

1. A method for evaluating a minimum braking distance of a vehicle, in particular a car, the method comprising:
    obtaining at least one image in a movement direction of the vehicle associated substantially with an actual location of the vehicle;
    determining, by a trained neural network architecture, first road type indication from the at least one image;
    obtaining from a database second road type indication associated with the actual location of the car;
    evaluating whether the second obtained road type indication supports the determined first road type indication;
    selecting an adjustment parameter, if the second road type indication supports the determined first road type indication, wherein the adjustment parameter is associated with one of the at least first and second road type indication;
    selecting a default adjustment parameter as the adjustment parameter, if the second road type indication does not support the determined first road type indication; and
    setting a minimum braking distance using the adjustment parameter.

2. The method according to claim 1, wherein obtaining at least one image comprises:
    obtaining an optical image, in particular a monocular image; and
    obtaining information from one or more sensors wherein one or more sensors include at least one of:
        LIDAR sensors;
        radar sensors;
        infrared sensors;
        acoustic sensors;
        rain sensors; and
        light sensors.

3. The method according to claim 1, wherein determining, by the trained neural network architecture comprises:
    determining for a first feature map from the obtained optical image a first probability value associated with a road type;
    determining for a second feature map from the obtained information a second probability value associated with a road type, wherein the steps of determining for the first or for the second feature map comprise at least one of:
        down sampling the obtained optical image;
        cropping the obtained optical image or the down sampled optical image;
        cropping the obtained information;

generating a feature map from cropped or down sampled optical image; and
generating a feature map from the cropped information;
determining for a third feature map combined of the first and second feature map a third probability value associated with the road type; and
determining a road type indication out of the first, second and third probability value, wherein determining the road type indication comprises:
obtaining at least one fourth probability value, the at least one fourth probability value associated with a previously determined road type indication;
determining the road type indication out of the first, second and third probability value and the at least one fourth probability value.

4. The method according to claim 1, wherein the trained neural network architecture comprises:
a trained ResNet architecture for providing a feature map of the obtained image or an image derived therefrom;
a trained PointNet architecture for providing a feature map of the obtained information or information derived therefrom; and
a Softmax function or derivate therefrom, configured to receive at least parts of the provided feature maps.

5. The method according to claim 1, wherein evaluating whether the second obtained road type indication supports comprises:
evaluating a difference between the first road type indication and the second road type indication; and
comparing the evaluated difference with a threshold to determine whether the second road type indication supports the determined first road type indication.

6. The method according to claim 1, wherein the default adjustment parameter is one of:
the adjustment parameter associated with the at least first and second road type indication that causes a longer minimum braking distance;
an adjustment parameter that causes a longer minimum braking distance than any of the adjustment parameters associated with the at least first and second road type indication; and
an adjustment parameter associated with a road type that causes the longest braking distance at a given speed compared to other road types.

7. The method according to claim 1, further comprising:
determining an environmental condition, in particular humidity, temperature, parameters from previously measured braking events or rain; and
adjusting the minimum braking distance in response to the determined environmental condition.

8. The method according to claim 1, further comprising:
determining, by the trained neural network architecture, a type of a leading vehicle from the obtained at least one image, wherein determining, by the trained neural network architecture comprises:
obtaining information about a type of a previously leading vehicle;
evaluating whether the information about a type of a previously leading vehicle supports the determined type of the leading vehicle; and
selecting an adjustment parameter, if the information about a type of a previously leading vehicle supports the determined type of the leading vehicle, wherein the adjustment parameter is associated with type of the leading vehicle; or
selecting a default adjustment parameter as the adjustment parameter, if the information about a type of a previously leading vehicle does not support the determined type of the leading vehicle; and
adjusting a minimum braking distance using the adjustment parameter; and
adjusting a minimum braking distance in response to the determined type of leading vehicle,
wherein adjusting the minimum braking distance comprises adjusting the minimum distance in response to at least one of:
the distance to the vehicle in front;
the speed of the vehicle in front; and
the speed of the own vehicle, and
wherein the trained neural network architecture comprises at least one ResNet architecture coupled a RPN and an Identification network architecture, in particular a region based convolutional neural network.

9. The method according to claim 1, wherein determining, by the trained neural network architecture comprises:
determining a first feature map from an obtained optical image;
determining a second feature map from obtained information, particular from LIDAR or RADAR information;
combining the first and second feature map to classify a vehicle and identify its type.

10. The method according to claim 1, wherein determining, by the trained neural network architecture comprises:
detecting one or more objects in the at least one obtained image utilizing a first sub-potion of the trained neural network architecture;
classifying one or more detected objects by a second sub-portion of the trained neural network architecture; and
identifying the type of car in response to the classified one or more detected objects.

11. The method according to claim 1, wherein the type of vehicle to be determined comprises at least one of:
a sports car or supercar;
a minivan;
a pick-up truck;
a SUV;
a van;
a truck; and
a motorcycle.

12. The method according to claim 1, further comprising:
determining a tyre tread,
wherein determining the tyre tread comprises:
measuring a braking distance or braking time at a predetermined speed;
calculating a nominal braking distance or nominal braking time based on at least one of:
the predetermined speed;
acceleration;
road type;
an environmental condition, in particular one of humidity, temperature and status of wipers;
nominal tyre tread; and
position of the vehicle;
evaluating the tyre tread as a function of the measured braking distance and the nominal braking distance, and
wherein determining the tyre tread comprises:
comparing an estimated tyre tread with a previously stored measurement of the tyre tread; and
selecting the tyre tread that causes a longer minimum braking distance; and adjusting a minimum braking distance in response to the determined tyre tread.

13. A vehicle, comprising:
a memory to store various sensor information;
one or more processors,
the vehicle configured to perform a method for evaluating a minimum braking distance of the vehicle, in particular a car, the method comprising:
obtaining at least one image in a movement direction of the vehicle associated substantially with an actual location of the vehicle;
determining, by a trained neural network architecture, first road type indication from the at least one image;
obtaining from a database second road type indication associated with the actual location of the car;
evaluating whether the second obtained road type indication supports the determined first road type indication;
selecting an adjustment parameter, if the second road type indication supports the determined first road type indication, wherein the adjustment parameter is associated with one of the at least first and second road type indication;
selecting a default adjustment parameter as the adjustment parameter, if the second road type indication does not support the determined first road type indication; and
setting a minimum braking distance using the adjustment parameter.

14. A vehicle having an arrangement for evaluating a minimum braking distance of the vehicle, the arrangement comprising:
one or more cameras to obtain at least one image in the direction of movement of the vehicle;
at least one other sensor to obtain sensor information indicative of the road type;
a first trained neural network architecture configured to determine first road type indication from the at least one image and the sensor information;
an evaluation unit coupled to the neural network architecture and to a database and configured to compare first road type indication with second road type indication from the database and to derive an adjustment parameter therefrom; and
a setting unit coupled to the evaluation unit and configured to set the minimum braking distance using the adjustment parameter.

15. The vehicle of claim 14, wherein the evaluation unit is configured to:
select an adjustment parameter, if the second road type indication supports the determined first road type indication, wherein the adjustment parameter is associated with one of the at least first and second road type indication; and
selecting a default adjustment parameter as the adjustment parameter, if the second road type indication does not support the determined first road type indication, and wherein the evaluation unit is further configured to:
obtain at least one fourth probability value, the at least one fourth probability value associated with a previously determined road type indication;
determine the road type indication out of the first, second and third probability value and the at least one fourth probability value;
determine for a first feature map from the obtained optical image a first probability value associated with a road type;
determine for a second feature map from the obtained information a second probability value associated with a road type;
determine for a third feature map combined of the first and second feature map a third probability value associated with the road type.

16. The vehicle according to claim 15, wherein the first trained neural network architecture is configured to:
determine for a first feature map from the obtained optical image a first probability value associated with a road type;
determine for a second feature map from the obtained information a second probability value associated with a road type;
determine for a third feature map combined of the first and second feature map a third probability value associated with the road type;
determine a road type indication out of the first, second and third probability value;
detecting one or more objects in the at least one obtained image utilizing a first sub-potion of the trained neural network architecture;
classifying one or more detected objects by a second sub-portion of the trained neural network architecture; and
identifying the type of car in response to the classified one or more detected objects, and
determine a road type indication out of the first, second and third probability value.

17. The vehicle according to claim 15, wherein the first and the second trained neural network architectures are configured at least one of:
down sampling the obtained optical image;
cropping the obtained optical image or the down sampled optical image;
cropping the obtained information;
generating a feature map from cropped or down sampled optical image;
generating a feature map from the cropped information.

18. The vehicle according to claim 14, further comprising:
a second trained neural network architecture configured to determine a type of a leading vehicle from the obtained at least one image, wherein the evaluation unit or the setting unit is configured to adjust a minimum braking distance based on at least the determined type of leading vehicle,
wherein the second trained neural network architecture is further configured to:
determine a first feature map from an obtained optical image;
determine a second feature map from obtained information; and
combine the first and second feature map to classify a vehicle and identify its type, and
wherein the first and/or the second trained neural network architecture comprises:
a trained ResNet architecture for providing a feature map of the obtained image or an image derived therefrom;
a trained PointNet architecture for providing a feature map of the obtained information or information derived therefrom; and
a Softmax function or derivate therefrom, configured to receive at least parts of the provided feature maps.

19. The vehicle according to claim 14, further comprising:
a tyre tread estimator coupled to the first neural network to receive a road indication;

wherein the tyre tread estimator is configured to estimate a tyre tread based at least on the speed of the vehicle, the road indication and an environmental condition, in particular temperature, humidity and rain, wherein the evaluation unit or the setting unit is configured to adjust a minimum braking distance in response to the estimated tyre tread.

\* \* \* \* \*